United States Patent
Erdos et al.

(10) Patent No.: US 8,095,014 B2
(45) Date of Patent: Jan. 10, 2012

(54) METHOD AND APPARATUS FOR ENHANCED FREE SPACE OPTICAL COMMUNICATION IN AN AVIATION ENVIRONMENT

(75) Inventors: David Erdos, Rogersville, MO (US); Timothy M. Mitchell, Seattle, WA (US); Tri Minh Phan, Renton, WA (US)

(73) Assignee: The Boeing Company, Chicago, IL (US)

( * ) Notice: Subject to any disclaimer, the term of this patent is extended or adjusted under 35 U.S.C. 154(b) by 562 days.

(21) Appl. No.: 12/330,315

(22) Filed: Dec. 8, 2008

(65) Prior Publication Data

US 2010/0142966 A1    Jun. 10, 2010

(51) Int. Cl.
*H04B 10/24* (2006.01)
*H04B 10/22* (2006.01)
*H04B 10/10* (2006.01)

(52) U.S. Cl. ..................... 398/128
(58) Field of Classification Search ........... 398/118–131
See application file for complete search history.

(56) References Cited

U.S. PATENT DOCUMENTS

| | | | | |
|---|---|---|---|---|
| 5,646,761 | A * | 7/1997 | Medved et al. | 398/123 |
| 6,842,439 | B2 * | 1/2005 | Zeitfuss | 370/328 |
| 6,944,402 | B1 * | 9/2005 | Baker et al. | 398/128 |
| 2007/0058976 | A1 * | 3/2007 | Tatum et al. | 398/99 |

FOREIGN PATENT DOCUMENTS

DE     3506715    * 8/1986

OTHER PUBLICATIONS

Free Space Optics, What is Free Space Optics (FSO)?, Lightpointe, http://www.freespaceoptics.org/freespaceoptics/default.cfm, copyright 2005, 3 pages.
Free Space Optics (FSO): Technology History Market Challenges Advantages, Sona, http://www.free-space-optics.org/, Richmond, BC, Canada, 4 pages, Printed Dec. 2008.
Free-space optical communication, http://en.wikipedia.org/wiki/Free_space_optics, Nov. 19, 2008, 4 pages.

* cited by examiner

*Primary Examiner* — Leslie Pascal
(74) *Attorney, Agent, or Firm* — Haynes and Boone, LLP

(57) ABSTRACT

A free space optical communications link is established, for example, between a commercial aircraft and an airport ground terminal unit, the link being asymmetric in the sense that a downlink to the aircraft has a much higher bandwidth than the reverse link from the aircraft so that the system is adapted for quickly loading large amounts of data (e.g., in-flight entertainment) onto the aircraft while still providing enough bandwidth for the lesser amounts of data (e.g., maintenance data) required to be transmitted from the aircraft to ground. Such adaptation provides significant benefits over standard, commercially available, free space optical communications systems. For example, equipment on the aircraft can be much smaller and lighter than ground unit equipment; and the communications link can allow for greater uncertainty in the alignment of the optical transceivers than do current free space optical communication systems and can allow for operation in harsher environmental conditions.

20 Claims, 3 Drawing Sheets

METHOD AND APPARATUS FOR ENHANCED FREE SPACE OPTICAL COMMUNICATION IN AN AVIATION ENVIRONMENT

TECHNICAL FIELD

The present disclosure generally relates to avionics and, in particular, to communication between an aircraft and a ground station.

BACKGROUND

Airlines regularly update in-flight entertainment (IFE) content on their aircraft, typically during the "turn around" time between successive flights when an airliner may be parked next to a jetway or gate at an airport ground terminal. Currently, the usual manner in which IFE content and other data needed by the aircraft is updated consists of sending maintenance personnel out to the aircraft who then manually (e.g., either through optical or magnetic media) transfer new IFE content onto the onboard file servers. Such a method can be slow and expensive however, due to the need for using trained personnel and having the personnel travel to the aircraft, connect equipment, monitor the transfer, disconnect the equipment, and return to the ground station.

Because of the large amount of data required to update the IFE content and other information, transferring data using other techniques, such as radio frequency (RF) communications, has not been a practical or cost effective alternative because of the high bandwidth required for such a system to update the data within a commercial airline's average airport turnaround time constraint, which may typically be about an hour between successive flights. In the future, RF based systems may increase enough in speed to allow some of the high bandwidth data transfer to be performed wirelessly, but there may remain electro-magnetic interference (EMI), spectrum availability, and licensing issues with RF systems.

As a result, there is a need to be able to transfer large amounts of data (e.g., in-flight entertainment content) onto an airplane at higher data rates than currently possible through existing communications technologies. There is also a need to update IFE content on commercial airlines' aircraft without requiring the presence of maintenance personnel on-site to upload new content manually.

SUMMARY

According to one embodiment, a communications system includes a first transceiver at a first location, the first transceiver comprising a laser transmitter and a first receiver adapted to receive transmissions from a light emitting diode (LED) transmitter; and a second transceiver at a second location, the second transceiver comprising the LED transmitter and a second receiver adapted to receive transmissions from the laser transmitter. The first transceiver and the second transceiver establish an asymmetric free space optical communications link having a higher bandwidth from the first location to the second location than from the second location to the first location.

According to another embodiment, a free space optical communications system includes a first transmitter on a ground location; a first receiver on an aircraft adapted to receive transmissions from the first transmitter at a first bandwidth; a second transmitter on the aircraft; and a second receiver on the ground location adapted to receive transmissions from the second transmitter at a second bandwidth. The first bandwidth is higher than the second bandwidth so that the transmitter and receiver on the airplane side are lighter than the transmitter and receiver on the ground side.

According to another embodiment, a method includes communicating using laser light at a first bandwidth on a downlink to an aircraft from a ground location; and communicating using LED light at a second bandwidth on an uplink from the aircraft to the ground location, in which the first bandwidth is higher than the second bandwidth.

The scope of the disclosure is defined by the claims, which are incorporated into this section by reference. A more complete understanding of embodiments will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments and their advantages are best understood by referring to the detailed description that follows. It should be appreciated that like reference numerals are used to identify like elements illustrated in one or more of the figures.

DETAILED DESCRIPTION

Figure 1:
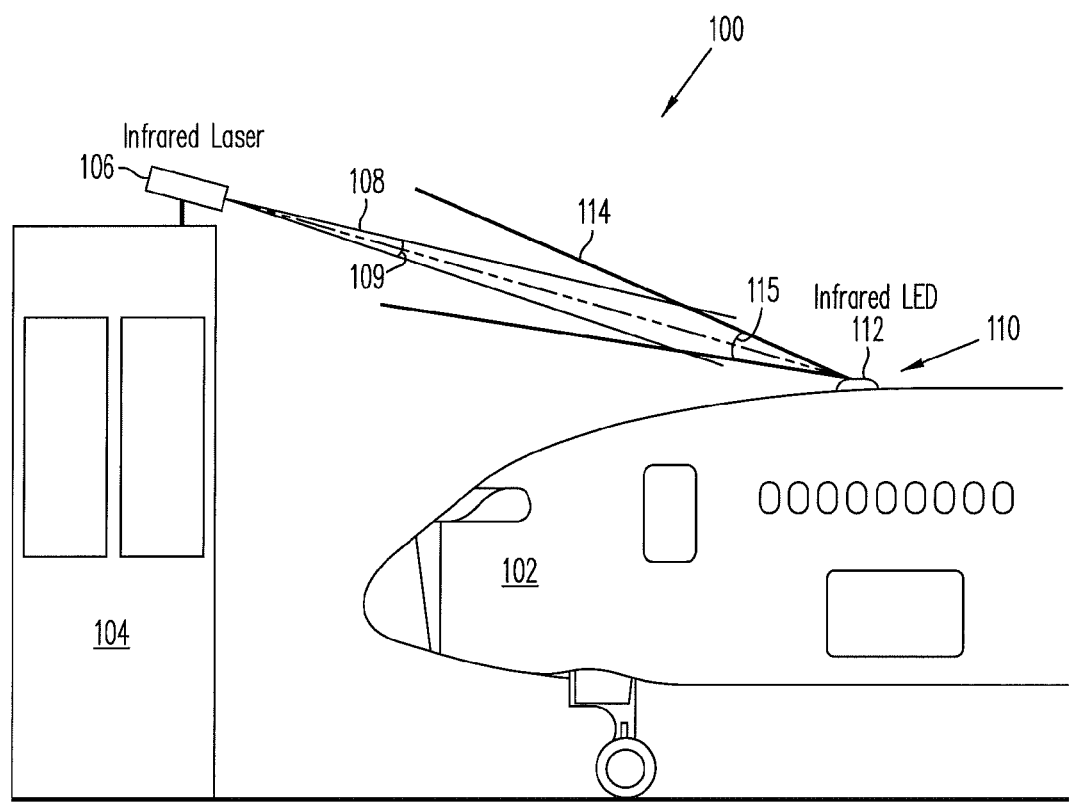
FIG. 1 is a pictorial diagram illustrating a ground terminal to aircraft free space optical communications system in accordance with one embodiment of the present disclosure.

In accordance with embodiments of the present disclosure, systems and methods disclosed herein provide for high speed free space optical (FSO) communications between an aircraft and ground systems (e.g., at a ground terminal at an airport) allowing the transfer of high bandwidth data (e.g., in-flight entertainment (IFE) content) when the aircraft is parked at a gate or jetway to transfer data through the use of an asymmetric data link. In one embodiment, a laser based optical transmitter and photo diode receiver communicate from the airport side of an FSO communications system, and a small blade shaped antenna operates from the aircraft side with a light emitting diode (LED) based transmitter and receiver adapted to receive laser signals. Embodiments may be useful to commercial airlines by allowing them to streamline their current processes regarding the updating of large volumes of data involved with in-flight-entertainment content by wirelessly transferring large volumes of data to an aircraft in a short amount of time. Currently, airlines are forced to send maintenance personnel out to each airplane in order to manually update IFE content, which can be time consuming, expensive, and can slow down the turnaround time between successive flights for airplanes at a gate. Transfer of this large data volume content is not currently possible within the existing time constraints for airliner turnaround using existing RF wireless systems. Using an embodiment, wireless data transfers can be made at very high data rates, allowing the updating of IFE content, as well as additional ground-to-aircraft data transfers, with a high enough throughput to meet the airline's operational constraints such as turnaround time. In addition, due to the fact that embodiments use optical technology as opposed to RF communications, there are no spectrum availability and licensing requirements and no problems with radio frequency electro-magnetic interference (EMI).

Current optical communications systems generally provide a symmetrical link between both transceivers, in contrast to embodiments of the present disclosure, which provide a high bandwidth link to the airplane, and a much lower but adequate level of bandwidth from the airplane. An embodiment of the present disclosure uses a combination, for example, of LEDs and lasers in an FSO communications system to provide an asymmetrical link with a much higher downlink (from the ground to the airplane) bandwidth than uplink bandwidth. By using an LED to transmit from the airplane side to the ground side (i.e., the uplink), more uncertainty in the alignment of the airplane can be tolerated and environmental factors (e.g., fog, absorption, scattering, physical obstructions, pointing stability, scintillation, solar interference) may have less effect on the performance of the uplink. In addition, an embodiment using a combination of LEDs and lasers can be lighter than a system using laser transceivers on both sides of the system.

While no currently available FSO communications systems are specifically adapted toward use with commercial aircraft, communications systems that use optical technology on both ends of the system and in use in other environments often require large laser transceivers (which are impractical for an airplane) and provide symmetrical bandwidth. Existing commercial FSO communications systems are also adapted to much greater distances (up to several kilometers) than needed for a ground terminal to aircraft system so that the light (i.e., optical) beam of existing systems is too narrow as to allow for uncertainty in the alignment of the transceivers, an important consideration for a ground terminal to aircraft system.

Embodiments of the present disclosure are adapted specifically for transferring large amounts of data to an airplane under the predictable and reliable constraints when it is parked at the location of an airport gate. Embodiments can be much faster and more efficient than current methods of having maintenance personnel upload updated WE data to the airplane manually, or transferring the data through existing RF communications links. Embodiments can also be much more efficient in terms of size and weight than implementations of existing FSO communication equipment on an aircraft.

FIG. 1 illustrates a ground terminal to aircraft communications system 100 in accordance with one embodiment of the present disclosure. As seen in FIG. 1, an aircraft 102 (e.g., an airplane or commercial airliner) may be parked (i.e., stationary) at a ground terminal 104 and may have a limited amount of time (also referred to as turnaround time) in which to complete certain operations such as de-boarding and boarding passengers, cleaning the aircraft interior, loading food and baggage, refueling, and communicating informational data to and from the aircraft. Turnaround time may depend on airport and airline scheduling, may be reliable and predictable, and may typically take on the order of one-half to one and one-half hours.

Ground terminal to aircraft communications system 100 may include a ground side optical transceiver 106, which may comprise a laser transmitter and an LED receiver. Ground side optical transceiver 106 may transmit a signal (also referred to as downlink signal) on a laser beam 108 to aircraft 102. Laser beam 108 may have a beam width 109 with a minimum width of 1 to 5 degrees. Ground terminal to aircraft communications system 100 may include an aircraft side optical transceiver 110, which may comprise an LED transmitter and a receiver adapted to receiving a signal on laser beam 108. Aircraft side optical transceiver 110 may be housed in a blade shaped antenna structure 112, which may, for example, reduce aerodynamic drag of transceiver 110. Aircraft side optical transceiver 110 may transmit a signal (also referred to as uplink signal) on an LED beam 114 to ground terminal 104. LED beam 114 may have a beam width 115 with a minimum width of 15 to 20 degrees.

Beam widths 109, 115 may provide flexibility in the positioning of the location and directional alignment of aircraft 102 with respect to the location of ground terminal 104 and transceiver 106 in that the aircraft may be positioned with respect to the gate or ground terminal 104 in the usual manner—e.g., without any special considerations being given to communications system 100—without affecting the signal quality or reliability of communications system 100.

The laser transmitter of ground side optical transceiver 106 may transmit data at rates on the order of magnitude of 10 Gigabits per second (Gbps) and may be used to transmit ground-to-aircraft data, which may typically contain a large volume of information. For example, ground-to-aircraft data may include IFE data—such as movies, music, and TV shows—airport approach plates, Jeppesen charts, loadable software parts and configuration data; and airline modifiable information (AMIs). The LED transmitter of aircraft side optical transceiver 110 may transmit data with lower bandwidth requirements back to the ground side of the system at rates on the order of magnitude of 100 megabits (Mbps) per second or more and may be used to transmit aircraft-to-ground data, which may typically contain a smaller volume of information than that of ground-to-aircraft data. For example, aircraft-to-ground data may include maintenance data; operational information; trending data; and configuration data.

Figure 2A:
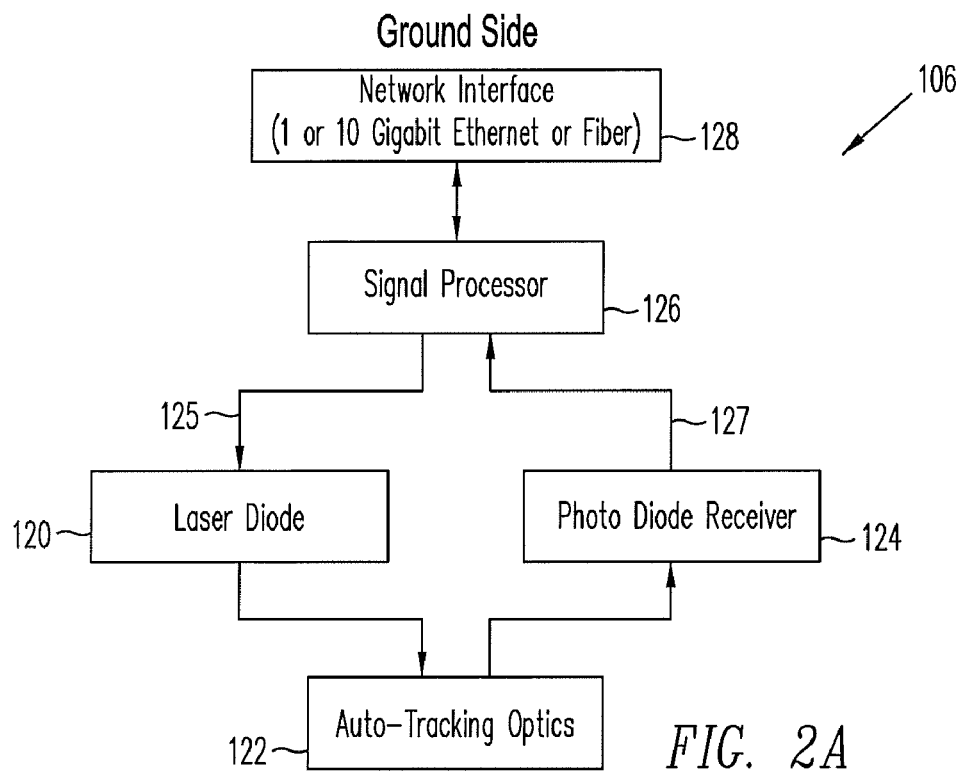
FIG. 2A is a system block diagram illustrating a ground side for the communication system shown in FIG. 1.

FIG. 2A illustrates ground side transceiver 106 for communication system 100 shown in FIG. 1 according to one embodiment. Ground side transceiver 106 may include a laser transmitter comprising a laser diode 120. Laser diode 120 may, for example, operate to provide a laser beam (e.g., beam 108) at a power output of approximately 5 to 11 milliWatts (mW) at a wavelength, for example, of approximately 785 nanometers (nm). Laser diode 120 may transmit beam 108 through an auto-tracking optics 122. Auto-tracking optics 122 may be used, for example, to direct the centerline of beam 108 within an angle of approximately plus-or-minus 10 degrees and may provide an additional flexibility in positioning and aligning aircraft 102 and tolerance for uncertainty in the alignment of the transceivers 106, 110.

Ground side transceiver 106 may include a photo-diode receiver 124 adapted to receive signals transmitted via an LED emitted optical (e.g., infrared, visible, or ultra-violet) beam such as LED beam 114. Photo-diode receiver 124 may receive LED beam 114 through auto-tracking optics 122. Auto-tracking optics 122 may be used in receiving, for example, as in the case of transmitting, to provide an additional flexibility in positioning and aligning aircraft 102 and tolerance for uncertainty in the alignment of the transceivers 106, 110 by directing the centerline of beam 108 more directly toward the position of blade antenna 112.

For transmitting, laser diode 120 may receive an input signal 125 from a signal processor 126, which may be implemented, for example, using field programmable gate array (FPGA), digital signal processor (DSP), or application specific integrated circuit (ASIC). For receiving, signal processor 126 may receive an input signal 127 from photo diode receiver 124. Signal processor 126 may communicate with other ground systems or users via a network interface 128, which may have capability, for example, to interface with 1 or 10 Gigabit Ethernet or a fiber optic communication system.

Figure 2B:
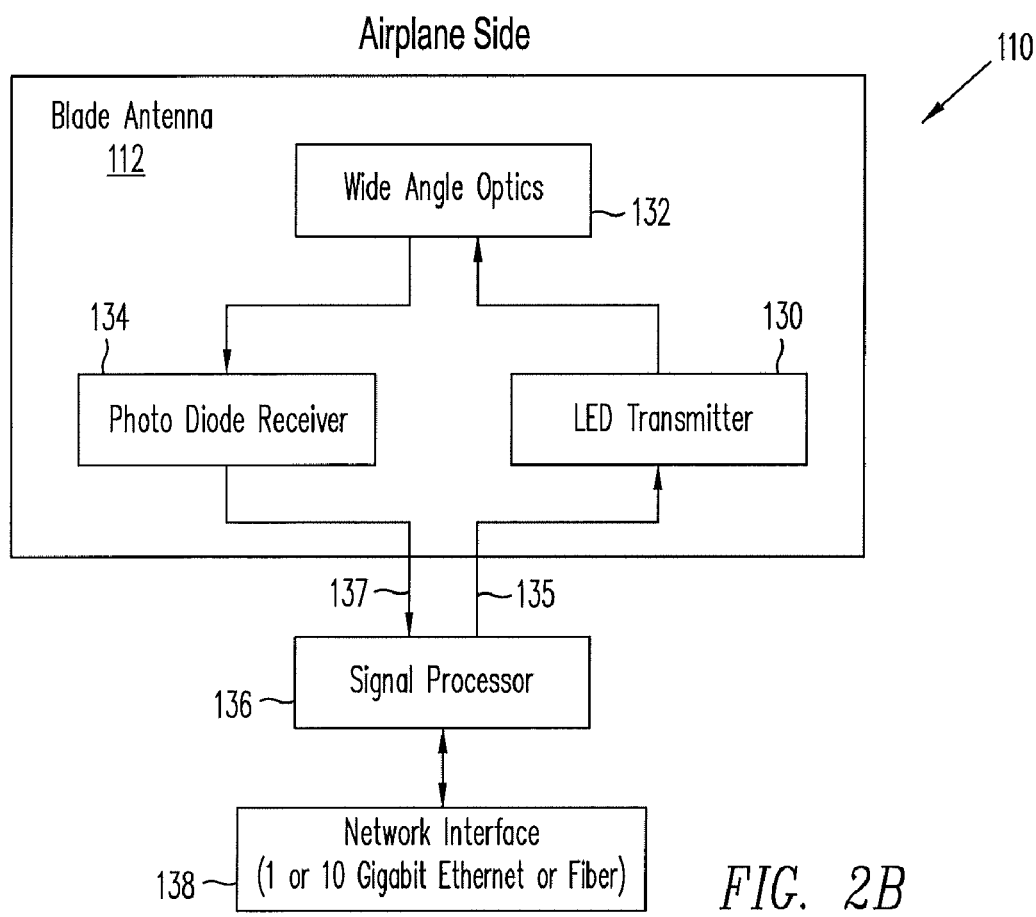
FIG. 2B is a system block diagram illustrating an aircraft side for the communication system shown in FIG. 1.

FIG. 2B illustrates aircraft side transceiver 110 for the communication system 100 shown in FIG. 1 according to one embodiment. Aircraft side transceiver 110 may include an LED transmitter 130 LED transmitter 130 may, for example, operate to provide an LED emitted optical beam (e.g., LED beam 114) at a power output of approximately 0.5 to 2 Watts (W) at a wavelength, for example, of approximately 785 nm. LED transmitter 130 may transmit LED beam 114 through a wide angle optics 132. Wide angle optics 132 may be used, for example, to provide an additional flexibility in positioning and aligning aircraft 102 and tolerance for uncertainty in the alignment of the transceivers 106, 110 by increasing the effective beam width on the aircraft side for both transmitting and receiving. Wide angle optics 132 may be effective for such a purpose at far less complexity, weight, and volume than auto-tracking optics 122 and may enable LED transmitter 130, wide angle optics 132, and photo-diode receiver 134 to be housed in an aerodynamically shaped blade antenna 112 mounted to the aircraft 102, as seen in FIG. 1.

Aircraft side transceiver 110 may include a photo-diode receiver 134 adapted to receive signals transmitted via laser beam such as laser beam 108. Photo-diode receiver 134 may receive laser beam 108 through wide angle optics 132.

For transmitting, LED transmitter 130 may receive an input signal 135 from signal processor 136, which, like signal processor 126, may be implemented, for example, using FPGA, DSP, or ASIC technology. For receiving, signal processor 136 may receive an input signal 137 from photo diode receiver 134. Signal processor 136 may communicate with other aircraft systems or users via a network interface 138, which may have capability, for example, to interface with 1 or 10 Gigabit Ethernet or a fiber optic communication system aboard the aircraft 102.

Figure 3:
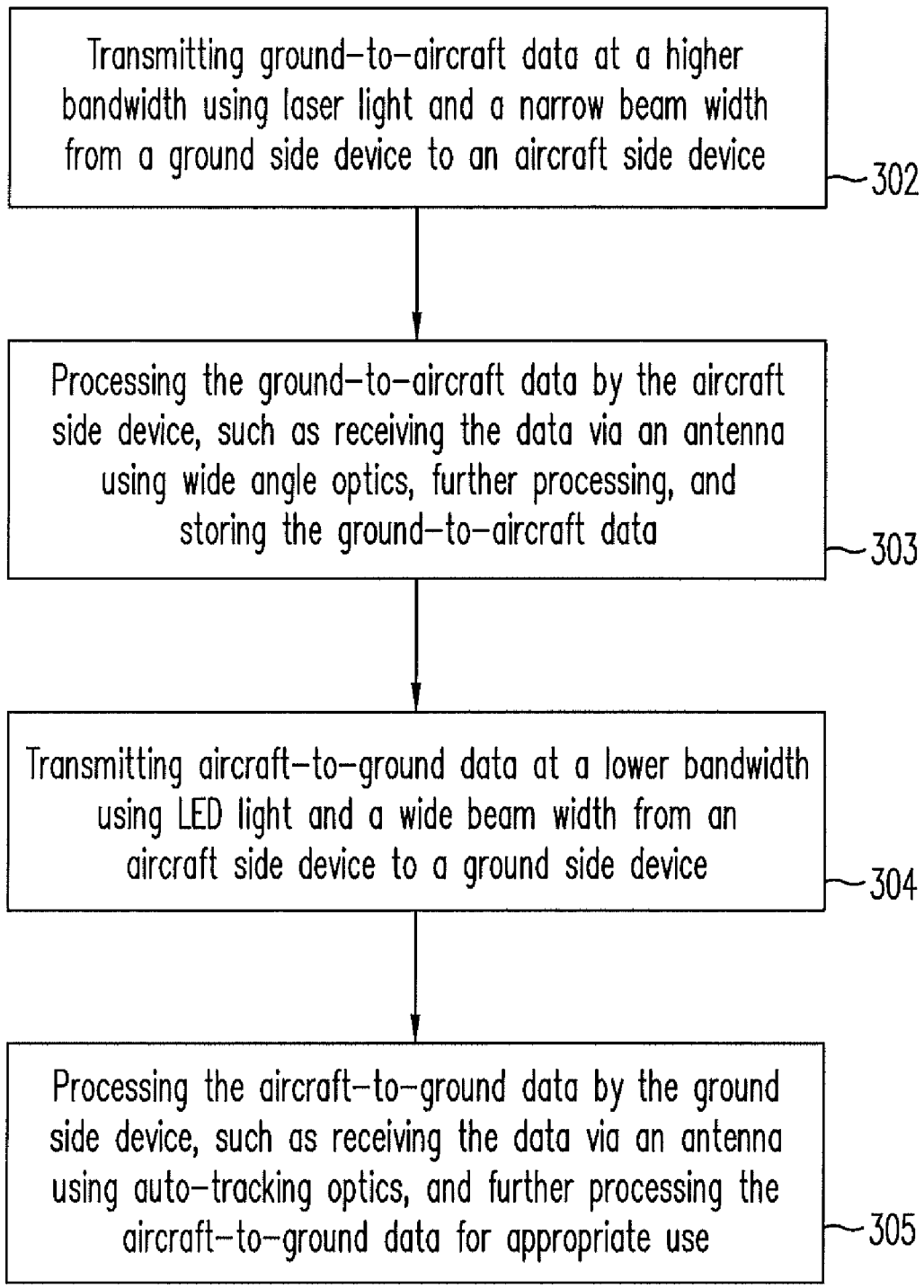
FIG. 3 is a flow chart illustrating a method for ground terminal to aircraft communications in accordance with one embodiment of the present disclosure.

FIG. 3 illustrates a method for ground terminal to aircraft communications in accordance with one embodiment of the present disclosure. At block 302, the method of FIG. 3 may transmit data at a first, higher bandwidth (e.g., suitable for completing transmission of a relatively larger amount of data comprising ground-to-aircraft data—such as WE data—within an aircraft turnaround time constraint) using laser light (e.g., laser beam 108) and a narrow beam width (e.g., about 1 to 5 degrees minimum beam width compared to 15 to 20 degrees minimum beam width for the aircraft side) from a ground side device (e.g., ground side transceiver 106) to an aircraft side device (e.g., aircraft side transceiver 110).

At block 303, the high bandwidth data is processed by the aircraft, such as receiving the data via a suitable antenna and wide-range optics. The data may then be further processed and stored for use, such as in presenting IFE to passengers.

At block 304, the method of FIG. 3 may transmit data at a lower bandwidth (e.g., suitable for completing transmission of a relatively lesser amount of data comprising aircraft-to-ground data—such as maintenance data; operational information; trending and configuration data—within an aircraft turnaround time constraint) using LED light (e.g., LED beam 114) and a wide beam width (e.g., about 15 to 20 degrees minimum beam width compared to 1 to 5 degrees minimum beam width for the ground side) from an aircraft side device (e.g., aircraft side transceiver 110) to a ground side device (e.g., ground side transceiver 106).

At block 305, the lower bandwidth data is processed by the ground station, such as receiving the data via a suitable antenna and auto-tracking optics. The ground station may then further process the data for appropriate use.

Because data is transmitted from the aircraft side device (e.g., aircraft side transceiver 110) at lower bandwidth and wider beam width (e.g., as just described), the aircraft side device 110 can be made to weigh less than that of a comparable symmetric system, occupy less volume (e.g., allowing aircraft side transmitter, receiver, and wide angle optics to be housed in blade antenna 112), and consume less power than a comparable symmetric system.

Embodiments described herein illustrate but do not limit the disclosure. For example, specific beam widths and powers, as well as specific types of transmitting frequencies, are described. However, other combinations may also be suitable, such that an asymmetric system may be implemented in which high bandwidth data is capable of being transmitted in one direction, while a lower bandwidth data and lower power transmission is capable of being transmitted in the other direction. It should also be understood that numerous modifications and variations are possible in accordance with the principles of the present disclosure. Accordingly, the scope of the disclosure is defined only by the following claims.

We claim:

1. A communications system comprising:
   a first transceiver at a first location, the first transceiver comprising a laser transmitter and a first receiver adapted to receive transmissions from a light emitting diode (LED) transmitter; and
   a second transceiver at a second location, the second transceiver comprising the LED transmitter and a second receiver adapted to receive transmissions from the laser transmitter, wherein:
   the first transceiver and the second transceiver establish an asymmetric free space optical communications link having a higher bandwidth from the first location to the second location than from the second location to the first location.

2. The communications system of claim 1, wherein:
   the first transceiver operates from a ground location and the second transceiver operates from an aircraft.

3. The communications system of claim 2, wherein the transmissions are received when the aircraft is stationary.

4. The communications system of claim 1, wherein:
   the second transceiver comprises a blade antenna mounted to an aircraft, the blade antenna housing the LED transmitter and the second receiver.

5. The communications system of claim 1, wherein:
   the second transceiver comprises a blade antenna mounted to an aircraft, the blade antenna housing a wide angle optics adapted to LED transmitting and laser receiving.

6. The communications system of claim 1, wherein:
   the first transceiver operates from a ground location and comprises a tracking optics for narrow beam width laser transmitting and LED receiving.

7. The communications system of claim 1, wherein:
   the first transceiver operates from a ground location and comprises a tracking optics; and
   the second transceiver comprises a blade antenna mounted to an aircraft, the blade antenna housing a wide angle optics.

8. The communications system of claim 1, wherein the higher bandwidth from the first side to the second side is in the range of approximately 1 to 10 Gbps.

9. A free space optical communications system comprising:
   a first transmitter on a ground location, wherein:
      a first transmitter beam width is adapted to short range transmission from a ground terminal to an aircraft parked at the ground terminal; and
      the first transmitter beam width is approximately 1 to 5 degrees in width;

a first receiver on an aircraft adapted to receive transmissions from the first transmitter at a first bandwidth;
a second transmitter on the aircraft; and
a second receiver on the ground location adapted to receive transmissions from the second transmitter at a second bandwidth, wherein the first bandwidth is higher than the second bandwidth.

10. The communications system of claim 9, wherein:
the first bandwidth is approximately 10 Gbps.

11. The communications system of claim 9, wherein:
the second bandwidth is at least approximately 100 Mbps.

12. The communications system of claim 9, wherein:
a second transmitter beam width is adapted to short range transmission from an aircraft parked at a ground terminal to the ground terminal; and
the second transmitter beam width is approximately 15 to 20 degrees in width.

13. The communications system of claim 9, wherein:
a first transmitter beam power is adapted to short range transmission from a ground terminal to an aircraft parked at the ground terminal; and
the first transmitter beam power is no greater than approximately 5 to 11 mW.

14. The communications system of claim 9, wherein:
a second transmitter beam power is adapted to short range transmission from an aircraft parked at a ground terminal to the ground terminal; and
the second transmitter beam power is no greater than approximately 0.5 to 2 W.

15. A method comprising:
communicating using laser light at a first bandwidth on a downlink to an aircraft from a ground location; and
communicating using LED light at a second bandwidth on an uplink from the aircraft to the ground location, wherein the first bandwidth is higher than the second bandwidth.

16. The method of claim 15, wherein:
the communicating using laser light comprises transmitting using a tracking optics for the downlink.

17. The method of claim 15, wherein:
the communicating using LED light comprises transmitting using a wide angle optics for the uplink, wherein the wide angle optics is fixedly mounted with respect to the aircraft.

18. The method of claim 15, wherein:
the communicating using laser light comprises transmitting ground-to-aircraft data at a high bandwidth.

19. The method of claim 15, wherein:
the communicating using LED light comprises transmitting aircraft-to-ground data at a lower bandwidth than the first bandwidth.

20. The method of claim 15, wherein:
the first bandwidth is at least 1 Gbps.

* * * * *